United States Patent
Mick et al.

[11] Patent Number: 5,869,205
[45] Date of Patent: Feb. 9, 1999

[54] ELECTROCHEMICAL CELL HAVING MULTIPLE ANODE COMPARTMENTS

[75] Inventors: Alvin R. Mick, Lorain; Lewis F. Urry, Elyria, both of Ohio

[73] Assignee: Eveready Battery Company, Inc., St. Louis, Mo.

[21] Appl. No.: 969,438

[22] Filed: Nov. 12, 1997

[51] Int. Cl.⁶ .................................................. H01M 6/00
[52] U.S. Cl. ..................... 429/164; 429/165; 29/623.1
[58] Field of Search .................................. 429/164–169, 429/171, 174; 29/623.1

[56] References Cited

U.S. PATENT DOCUMENTS

| | | | |
|---|---|---|---|
| 2,605,298 | 7/1952 | Marsal . | |
| 3,043,899 | 7/1962 | Coleman | 429/164 X |
| 3,196,051 | 7/1965 | Balaguer . | |
| 3,335,031 | 8/1967 | Kordesch | 429/164 X |
| 3,364,073 | 1/1968 | Balaguer | 429/165 |
| 3,787,243 | 1/1974 | Zaleski | 429/164 X |
| 5,501,924 | 3/1996 | Swierbut et al. . | |

*Primary Examiner*—Anthony Skapars
*Attorney, Agent, or Firm*—Robert W. Welsh

[57] ABSTRACT

An electrochemical cell is provided having a first electrode, such as a cathode, and a plurality of second electrodes, such as anodes, provided in a cell container. A plurality of cavities are formed within the cathode. A separator and anode are disposed within each of said cavities, and a current collector electrically connects the anodes together. According to one embodiment, a plurality of cylindrical anodes are provided. According to a second embodiment, a plurality of semi-cylindrical anodes are disclosed.

25 Claims, 3 Drawing Sheets

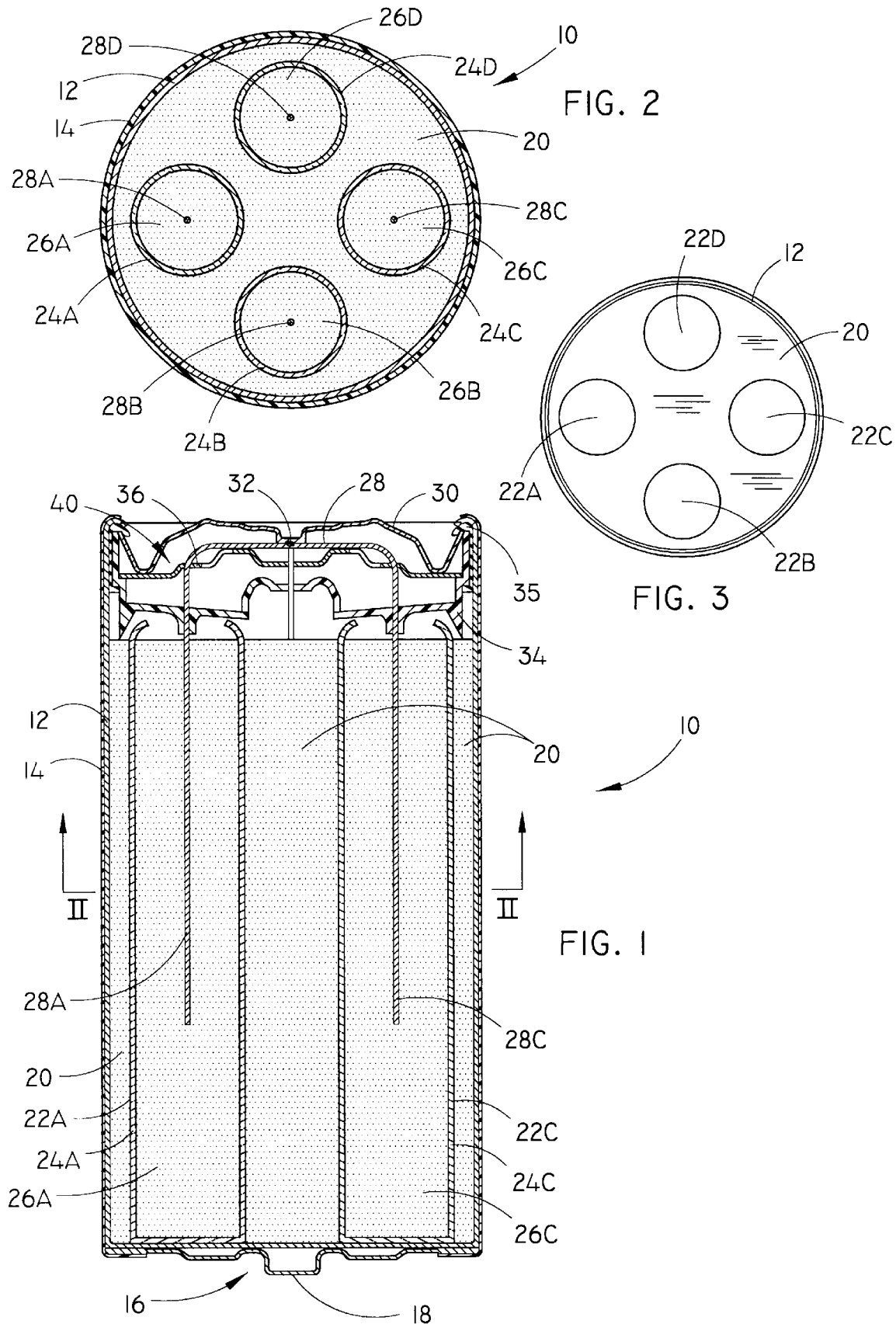

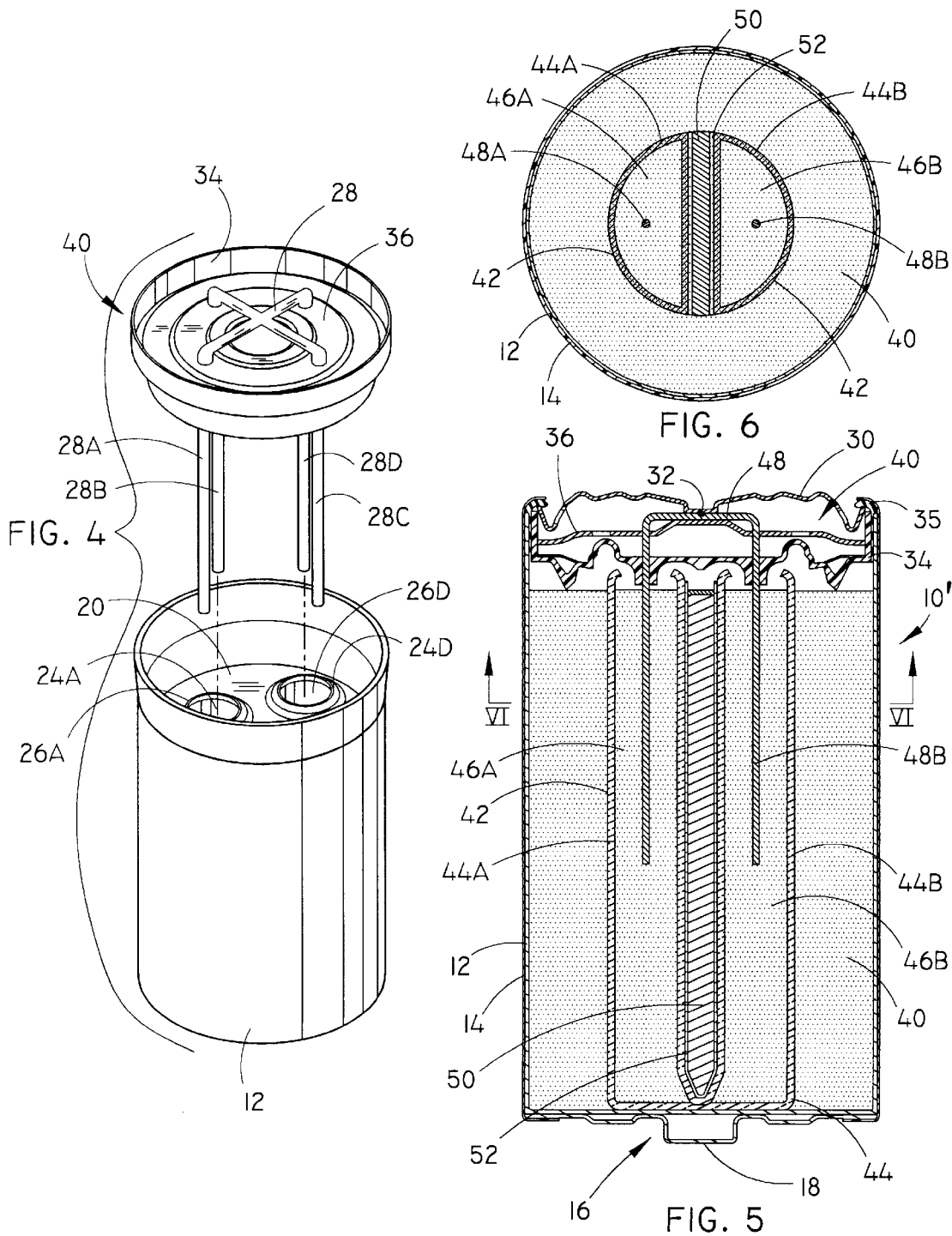

ELECTROCHEMICAL CELL HAVING MULTIPLE ANODE COMPARTMENTS

BACKGROUND OF THE INVENTION

The present invention generally relates to an electrochemical cell and, more particularly, relates to an electrochemical cell having increased anode-to-cathode interface area.

Electrochemical cells are commonly employed to supply voltage for electrically operated devices, particularly for portable electrically operated devices. Currently, the popular alkaline cells of the generally cylindrical type are commercially available in industry standard sizes including D-, C-, AA-, AAA-, and AAAA-size cells, as well as other sizes and configurations. Electrochemical cells, such as the aforementioned type, commonly provide a predetermined open circuit voltage supply.

Conventional cylindrical alkaline cells generally have a cylindrical-shaped steel can provided with a positive cover at one end and a negative cover at the opposite end. The cylindrical cell has a positive electrode, commonly referred to as the cathode, which is often formed of a mixture of manganese dioxide, graphite, potassium hydroxide solution, deionized water, and a TEFLON® solution formed about the interior side surface of the cylindrical steel can. A cup-shaped separator is generally centrally disposed in an inner cylindrical volume of the can about the interior surface of the cathode. A negative electrode, commonly referred to as the anode, is typically formed of zinc powder, a gelling agent, and other additives, and is disposed along with an electrolyte solution within the separator. One example of a conventional cylindrical cell is disclosed in U.S. Pat. No. 5,501,924, which is hereby incorporated by reference.

Conventional cells of the aforementioned cylindrical type commonly have a single anode and a single cathode contained within the steel can with the separator interfaced therebetween. Usually, the cathode is disposed adjacent the inner wall of the steel can, while the anode is disposed within a cylindrical volume defined by the cathode. Accordingly, the separator has an anode-to-cathode interface area generally defined by the shape and size of the anode and cathode. With the conventional cell, the anode-to-cathode interface area is approximately equal to the surface area of the periphery of the cylindrical anode. In addition, the anode is generally provided in the shape of a cylinder with a uniformly curved outer surface parallel to the container wall such that the cathode is not easily susceptible to breakage which can lead to ionic and electric discontinuity within the cell.

A primary goal in designing alkaline cells is to increase the service performance which is the length of time for the cell to discharge under a given load to a specific voltage at which the cell is no longer useful for its intended purpose. Commercially available alkaline cells commonly have an external size that is defined by industry standards, thereby limiting the ability to increase the amount of active cell materials that can be utilized. Yet, the need to find new ways to increase service performance remains the goal of the cell designers.

SUMMARY OF THE INVENTION

The present invention improves the performance of an electrochemical cell by providing a cell having an increased anode-to-cathode interface area so as to realize enhanced service performance. To achieve this and other advantages, and in accordance with the purpose of the invention as embodied and described herein, the present invention provides an electrochemical cell including a container having a closed bottom end and an open top end, with a first electrode disposed within the container. A plurality of cavities are formed extending within the first electrode. A separator is disposed in each of the cavities. A second electrode is disposed within each of the separators within the plurality of cavities. A current collector is connected to each of the second electrodes, and a cover with seal assembly is assembled to the open top end of the container. According to one embodiment, the first electrode comprises a cathode, while the plurality of second electrodes each comprises an anode.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 1 is an elevational cross-sectional view of an electrochemical cell of the present invention taken along the longitudinal axis thereof;

FIG. 2 is a cross-sectional view of the electrochemical cell of FIG. 1 taken through lines II—II;

FIG. 3 is a top view of the container of a partially assembled cell having a cathode provided with a plurality of cavities formed therein;

FIG. 4 is an exploded view of the cell illustrating a cover and seal assembly with current collector for insertion into the cell container;

FIG. 5 is an elevational cross-sectional view of an electrochemical cell according to another embodiment of the present invention taken along the longitudinal axis thereof;

FIG. 6 is a cross-sectional view of the electrochemical cell shown in FIG. 5 taken through lines VI—VI.

DETAILED PRESCRIPTION OF THE PREFERRED EMBODIMENTS

Figure 7:
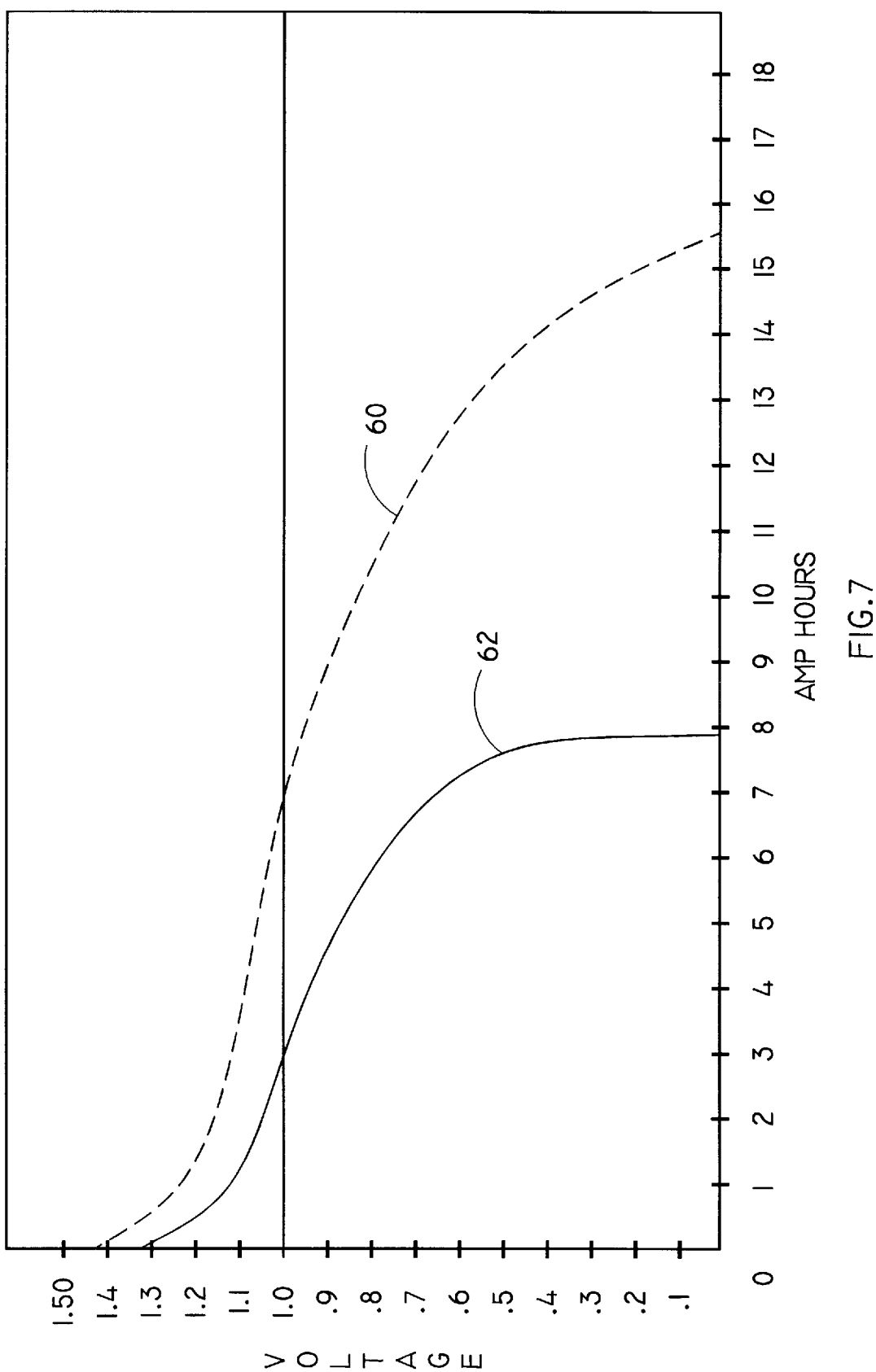
FIG. 7 is a comparative graph illustrating the service performance of an electrochemical cell of the present invention compared to a conventional cell.

Referring now to FIG. 1, an electrochemical cell 10 is shown having a first electrode, referred to herein as the cathode, and a plurality of second electrodes, referred to herein as the anodes. While the cathode serves as a positive electrode and the anodes serve as negative electrodes, it should be appreciated that the teachings of the present invention are not intended to be limited to the preferred embodiments shown. Further, while the electrochemical cell 10, as shown and described herein, is a cylindrical alkaline cell, it should also be appreciated that the teachings of the present invention can be applied to various types of electrochemical cells having various sizes and configurations.

The electrochemical cell 10 includes a cylindrical steel can 12 having a closed bottom end and an open top end. A metallized, plastic film label 14 is formed about the exterior surface of steel can 12, except for the top and bottom ends thereof. Assembled to the closed end of can 12 is a positive cover 16, preferably formed of plated steel with a protruding nub 18 at its center region, which forms the positive contact terminal of the cell 10. Assembled to the open end of can 12 is a cover and seal assembly 40 and outer cover 30 which forms the negative contact terminal of cell 10.

The cathode 20, preferably formed of a mixture of manganese dioxide, graphite, potassium hydroxide solution, deionized water, and a TEFLON® suspension, is formed about the interior side surface of steel can 12. According to the present invention, the cathode 20 has a plurality of anode cavities, such as four cavities 22A–22D, formed therein and preferably extending through the entire length of cathode 20. Each of cavities 22A–22D may be formed by drilling a hole or otherwise forming a cylindrical cavity within cathode 20 such that a sufficient amount of cathode 20 remains between each of the anode cavities 22A–22D and between each cavity and the interior side of steel can 12.

Four cup-shaped separators 24A–24D, which are preferably formed of a non-woven fabric that prevents migration of any solid particles in the cell, are disposed within the corresponding anode cavities 22A–22D such that the outer face of each separator is disposed against the interior surface of the cathode 20. Each of the separators 24A–24D preferably extends through the corresponding anode cavities, 22A–22D, respectively, and may have an excess amount of separator material extending above the top surface of cathode 22. Injected or otherwise disposed within each of the cup-shaped separators 24A–24D is an anode, identified as anodes 26A–26D, respectively. Accordingly, the corresponding anodes 26A–26D are disposed against an inner face of the corresponding separators 22A–22D. Each of anodes 26A–26D may include a gel type anode formed of non-amalgamated zinc powder, a gelling agent, and other additives, and mixed with an electrolyte solution which may be formed of potassium hydroxide, zinc oxide, and water. It should be appreciated that various types of anodes and cathodes may be employed without departing from the teachings of the present invention.

Disposed within the anodes 26A–26D is a four-prong current collector 28 having four conductive prongs 28A–28D. Each of the conductive prongs 28A–28D extends within one of the anodes 26A–26D so as to realize contact with the anode zinc concentration. The four conductive prongs 28A–28D are in conductive contact with each other such that anodes 26A–26D are electrically connected to each other and to the negative cell terminal. Accordingly, the four-prong current collector 28 provides a conductive path from the zinc concentration in each of the anodes 26A–26D, respectively, to the negative cell terminal.

Assembled to the open end of steel can 12 is the cover and seal assembly 40, which provides a closure to the assembly of cell 10. The cover and seal assembly 40 includes an inner seal body 34, that may include nylon, and an inner metal cover 36 that is disposed on top of the seal body 34. The four-prong current collector 28 is preassembled as part of the cover and seal assembly 40, such that the current collector prongs 28A–28D extend through openings in inner metal cover 36 and seal body 34 prevents leakage of active ingredients contained in steel can 12. Seal body 34 contacts and seals each of prongs 28A–28D of current collector 28 and further provides a seal within the interior surface of the top end of steel can 12. An outer negative cover 30, which is preferably formed of a plated steel, is disposed in contact with the inner cell cover 36 and spot-welded via weld 32 or otherwise connected to the top end of current collector 28. The outer negative cover 30 is electrically insulated from steel can 12 via seal body 34 and gasket 35.

Referring to FIG. 3, the steel can 12 is shown from a top view in a partially assembled state having cathode 20 disposed throughout the volume of steel can 12 with the four anode cavities 22A–22D provided therein. The four anode cavities 22A–22D are shown drilled or otherwise formed within cathode 20 and having sufficient cathode material remaining between each of the corresponding cavities and between each of the cavities and the interior surface of steel can 12. It is preferred to provide adequate cathode material surrounding the sides of the cavities so that optimum cell reaction is achieved. It should be appreciated that the cavities 22A–22D can be formed by impact molding the cathode within the cell can or by forming cylindrical rings with a plurality of the cavities prior to insertion in the can.

With particular reference to FIG. 4, the steel can 12 is further shown with cup-shaped separators 24A–24D and anode 26A–26D, assembled in the corresponding anode cavities 22A–22D. Also shown is the cover and seal assembly 40 containing the current collector 28, inner cover 36, and seal body 34, as it is installed within steel can 12. Cover and seal assembly 40 is preferably preassembled and installed as a single unit such that current collector prongs 28A–28D are disposed in contact with zinc concentration in the corresponding anodes 26A–26D. At the same time, the cover and seal assembly 40 is force-fitted within the top portion of steel can 12 to form a seal, as should be evident to one skilled in the art. Once the cover and seal assembly 40 is installed, the outer negative cover 30 is assembled to the top end of can 12 and the top end of steel can 12 is crimped to hold the outer negative cover 30 in place and contacting the top current collector 28.

Referring to FIGS. 5 and 6, an electrochemical cell 10' is shown according to an alternate embodiment of the present invention. Electrochemical cell 10' has a cylindrical steel can 12 with a closed bottom end and an open top end, and a metallized, plastic film label 14 formed about the exterior surface, except for the ends thereof. A positive cover 16 is assembled to the closed end and is formed of a plated steel with a protruding nub 18 at its center region, which forms a positive contact terminal of the cell 10'. According to the alternate embodiment, a cathode 40 is provided formed about the interior volume of steel can 12, with a cavity 42 provided at the inner cylindrical volume thereof. The cathode 40 of cell 10' is preferably formed of a mixture of manganese dioxide, graphite, potassium hydroxide solution, deionized water, and a TEFLON® suspension.

Disposed within cylindrical cavity 42 are first and second separators 44A and 44B containing first and second anodes 46A and 46B, respectively. Separator 44A and the corresponding anode 46A are provided in conforming semi-cylindrical configurations. Likewise, separator 44B and corresponding anode 46B are configured in conforming semi-cylindrical configurations. Disposed between the flat walls of separators 44A and 44B is cathodic material for providing ionic and electric continuity from the cathode 40 and throughout the volume between separators 44A and 44B. According to one embodiment, a conductive plate 50, preferably made of a perforated metal, is fit between flat surfaces of separators 44A and 44B and interference fit against the cathode 20. Conductive plate 50 preferably contains a coating of active cathode material, such as manganese dioxide, preferably mixed with graphite and a binder, that is bonded to conductive plate 50. The active cathode material coating of manganese dioxide therefore abuts the separators 44A and 44B, while the conductive plate 50 provides electric conductivity from the cathode 40 to the manganese dioxide at the anode-to-cathode interface surface provided along the flat portions of the separators 44A and 44B.

The first and second separators 44A and 44B may be formed of a non-woven fabric configured in the shape of a bent tube 44. The conductive plate 50 with manganese dioxide coating 52 can be installed in cavity 42 by shoving conductive plate 50 against the middle portion of the separator tube 44 such that the tubular separator is bent as it is inserted within cavity 42. Conductive plate 50 forcibly urges the separator tube 44 to the bottom of steel can 12 so as to form two anode compartments, while at the same time forming an interference fit between plate 50 and cathode 20. In addition, the separator tube 44 could be sealed at the bottom with paraffin wax, a washer, or heat seal so as to keep the first and second anode compartments separate from one another.

The electrochemical cell 10' further includes a two-prong current collector 48 having one prong 48A disposed within anode 46A and a second current collector prong 48B disposed within anode 46B. The first and second prongs 48A and 48B of current collector 48 may be formed of a single conductive wire or foil and are electrically coupled to the negative terminal of cell 10'. Cell 10' similarly has a cover and seal assembly 40 with seal body 34, inner cover 36, and an outer negative cover 30 assembled thereon.

The electrochemical cell 10' according to the alternate embodiment could alternately be made up of two semi-cylindrical separators and anodes having the cathode 40 extending between the separators and interior surface of can 12, and also between the separators themselves, in lieu of the conductive plate 50 with manganese dioxide coating. This could be accomplished by forming two semi-cylindrical cavities in a cylindrical cathode so that cathode exists between the two cavities.

Accordingly, an alkaline cell 10 or 10' is provided in accordance with the present invention, which has an increased anode-to-cathode interface area as compared to the conventional single anode/single cathode cell. The increase in anode-to-cathode area that is realized with the present invention advantageously increases the service performance, particularly for a high-rate electrochemical cell. Referring to FIG. 6, the performance curve 60 of an electrochemical cell 10, according to one example of the present invention, is shown compared to the performance curve 62 of a conventional single anode cell. The example of electrochemical cell 10 used in the aforementioned comparative example includes four anode compartments, as set forth in accordance with FIG. 1 of the present invention, in a standard D-size cell with the anodes having a diameter of approximately 0.387" and a cathode material between adjacent anodes of at least 0.134". The quantity of anode and cathode materials and electrolyte solution remained the same for cell 10 of the present invention and the conventional cell as tested in this comparative example. The test was performed by discharging the cells at room temperature at a two-amp continuous drain. Performance curve 62 illustrates enhanced service performance due to the increase in anode-to-cathode interface area.

While a cell 10 or 10' having four or two anodes, respectively, is shown and described herein, it should be appreciated that the teachings of the present invention are applicable to any multiple of anodes. For example, a cell having five cylindrical anodes disposed in a single cathode can be provided in accordance with the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. An electrochemical cell comprising:
    a container having a closed bottom end and an open top end;
    a first electrode disposed in said container;
    a plurality of cavities extending within said first electrode;
    a separator disposed within each of said plurality of cavities;
    a second electrode disposed within each said separator within each of said plurality of cavities;
    a collector connected to each said second electrode; and
    a cover and seal assembly assembled to said open top end of said container.

2. The electrochemical cell as defined in claim 1, wherein said first electrode is disposed against an interior surface of said container.

3. The electrochemical cell as defined in claim 1, wherein said first electrode has substantial ionic and electric continuity throughout said first electrode.

4. The electrochemical cell as defined in claim 1, wherein said electrode comprises a cathode.

5. The electrochemical cell as defined in claim 1, wherein said container is cylindrical.

6. The electrochemical cell as defined in claim 1, wherein said second electrode comprises an anode.

7. The electrochemical cell as defined in claim 1, wherein each of said cavities is substantially cylindrical for receiving a substantially cylindrical electrode.

8. The electrochemical cell as defined in claim 1, wherein said current collector comprises multiple conductive contacts commonly connected together, each of said multiple conductive contacts being disposed within one of said plurality of respective cavities.

9. The electrochemical cell as defined in claim 1, wherein said current collector is electrically connected to an outer cover.

10. An electrochemical cell comprising:
    a container having a closed bottom end and an open top end;
    a first electrode disposed in said container;
    first and second cavities spaced apart from one another and extending within said first electrode;
    a first separator disposed in said first cavity and a second separator disposed within said second cavity;
    a second electrode disposed in said first separator within said first cavity;
    a third electrode disposed within said second separator within said second cavity;
    a current collector electrically connected to both said second and third electrodes; and
    a cover and seal assembly assembled to said top end of said container.

11. The electrochemical cell as defined in claim 10, wherein said first electrode comprises a cathode, and said second and third electrodes each comprises an anode.

12. The electrochemical cell as defined in claim 10, wherein said container is cylindrical.

13. The electrochemical cell as defined in claim 10, wherein said first and second cavities are each substantially cylindrical for receiving cylindrical second and third electrodes, respectively.

14. The electrochemical cell as defined in claim 10, wherein said current collector comprises first and second conductive contacts connected together, said first conductive contact being disposed within said first cavity and said second conductive contact being disposed within said second cavity.

15. The electrochemical cell as defined in claim 10, wherein said current collector is electrically connected to an outer cover.

16. The electrochemical cell as defined in claim 10, further comprising:
  third and fourth cavities provided in said first electrode;
  a third separator disposed within said third cavity and a fourth separator disposed within said fourth cavity;
  a fourth electrode disposed within said third separator within said third cavity; and
  a fifth electrode disposed within said fourth separator within said fourth cavity, wherein said current collector is electrically connected to said second, third, fourth, and fifth electrodes.

17. An electrochemical cell comprising:
  a container having a closed bottom end and an open top end;
  a cathode disposed within said container;
  a plurality of cavities extending within said cathode;
  a separator disposed within each of said cavities;
  an anode disposed within each of said separators within each of said plurality of cavities;
  a collector connected to each of said anodes; and
  a cover and seal assembly assembled to said open top end of said container.

18. The electrochemical cell as defined in claim 17, wherein each of said anodes is disposed within a cylindrical cavity.

19. The electrochemical cell as defined in claim 17, wherein said cathode is disposed against the interior surface of said container.

20. The electrochemical cell as defined in claim 17, wherein said cathode has substantial ionic and electric continuity throughout said cathode.

21. The electrochemical cell as defined in claim 17, wherein said container is cylindrical.

22. A method of assembling an electrochemical cell comprising:
  disposing a first electrode in a container having a closed bottom end and an open top end;
  forming a plurality of cavities extending within said first electrode;
  disposing a separator within each of said plurality of cavities;
  disposing a second electrode within each separator within each of said plurality of cavities;
  disposing a collector within each said second electrode; and
  assembling a cover and seal assembly to said open end of said container.

23. The method as defined in claim 22, wherein said first electrode comprises a cathode and said second electrode comprises an anode.

24. The method as defined in claim 22, wherein said collector connected to each said second electrode is electrically connected together and to an outer cover of said cell.

25. The method as defined in claim 22, wherein said step of providing a plurality of cavities comprises providing a plurality of cylindrical cavities.

* * * * *